No. 702,525. Patented June 17, 1902.
H. W. ARNER & C. M. GOODWIN.
CAKE COOKER AND TURNER.
(Application filed Aug. 29, 1901.)

(No Model.) 2 Sheets—Sheet 1.

Inventors
H. W. Arner and
C. M. Goodwin

Witnesses:
By H. B. Willson & Co.
Attorney

THE NORRIS PETERS CO., PHOTO-LITHO., WASHINGTON, D. C.

No. 702,525. Patented June 17, 1902.
H. W. ARNER & C. M. GOODWIN.
CAKE COOKER AND TURNER.
(Application filed Aug. 29, 1901.)
(No Model.) 2 Sheets—Sheet 2.
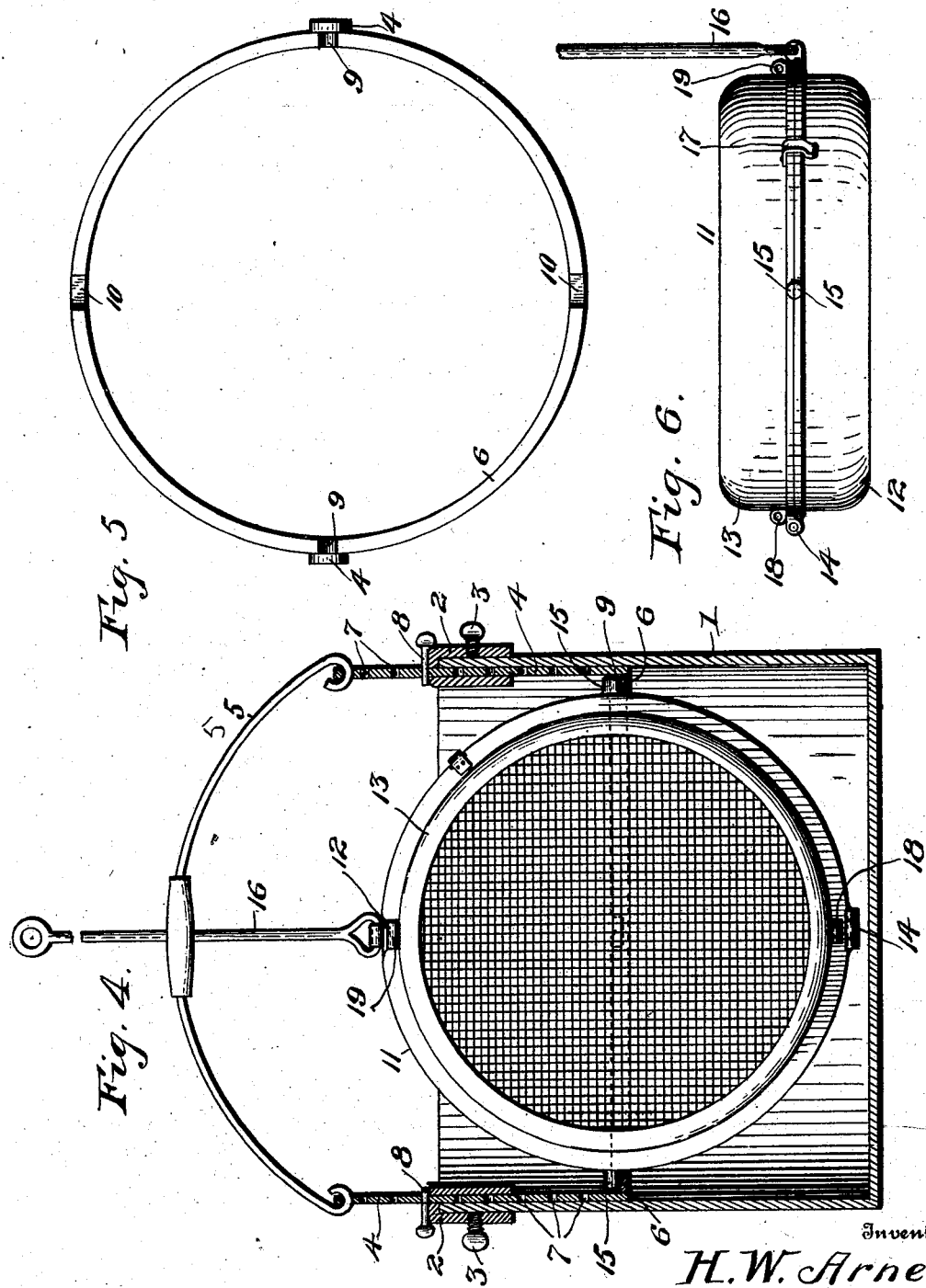
Inventors
H. W. Arner
and C. M. Goodwin

UNITED STATES PATENT OFFICE.

HARRY W. ARNER AND CHARLES M. GOODWIN, OF CUBA, NEW YORK.

CAKE COOKER AND TURNER.

SPECIFICATION forming part of Letters Patent No. 702,525, dated June 17, 1902.

Application filed August 29, 1901. Serial No. 73,738. (No model.)

*To all whom it may concern:*

Be it known that we, HARRY W. ARNER and CHARLES M. GOODWIN, citizens of the United States, residing at Cuba, in the county of Allegany and State of New York, have invented certain new and useful Improvements in Cake Cookers and Turners; and we do declare the following to be a full, clear, and exact description of the invention, such as will enable others skilled in the art to which it appertains to make and use the same.

This invention relates to improvements in cake cookers and turners.

The object of the invention is to provide a device of this character which is simple of construction and by means of which the cake-pan may be conveniently turned over to cook both sides of the cake alike and also raised and lowered in a vessel containing hot grease according to the depth of the grease within the pan and that to which it is desired to have the cakes submerged.

A further object of the invention is to provide a cake-pan holder and supporter which may be readily and conveniently applied to pots or vessels of ordinary construction which are to contain the hot grease in which the cakes are cooked and to provide means whereby said holder and supporter may be adjustably held at any desired elevation and raised and lowered to withdraw the pan from the grease and to submerge it therein.

With these and other objects in view the invention consists of certain novel features of construction, combination, and arrangement of parts, as will be hereinafter more fully described, and particularly pointed out in the appended claims.

Figure 1:
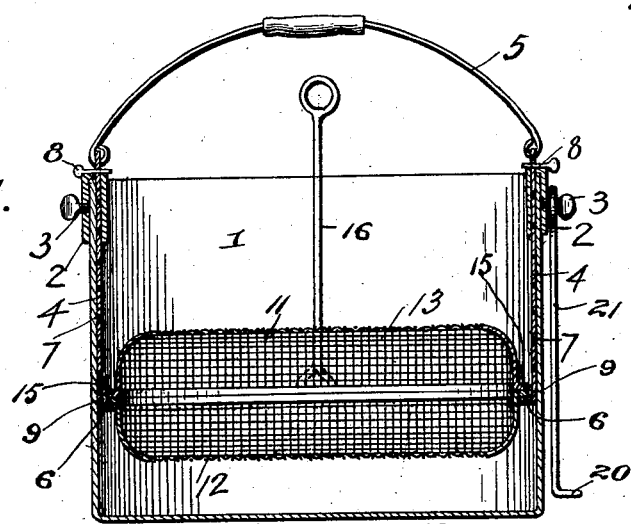
Figure 2:
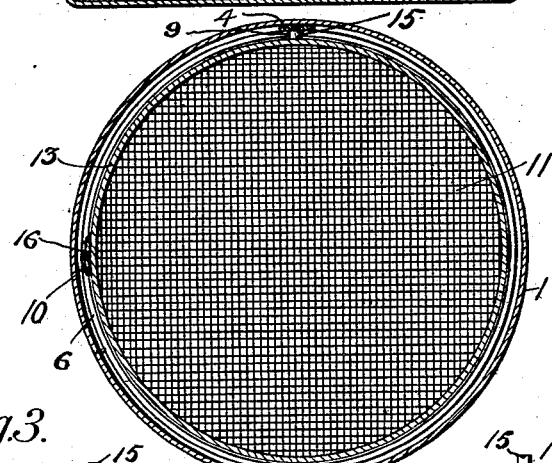
Figure 3:
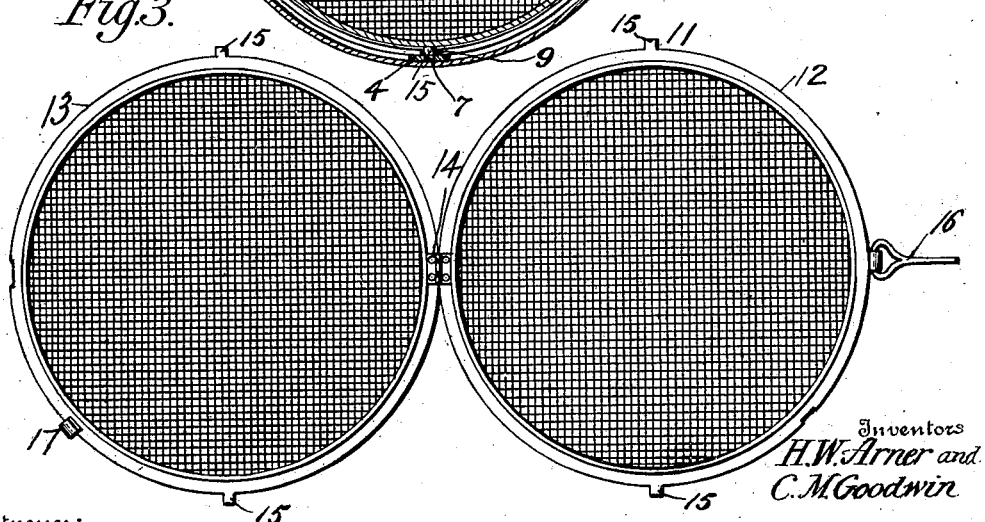

In the accompanying drawings, Figure 1 is a central vertical longitudinal section of a grease pot or vessel having our improved cake cooking and turning device applied thereto. Fig. 2 is a horizontal section of the grease pot or vessel, showing the cake cooking and turning device supported therein; and Fig. 3 is a plan view of the cake-pan, showing the two sections thereof open. Fig. 4 is a vertical section similar to Fig. 1, showing the cake-pan tilted to a vertical position in the operation of turning it over. Fig. 5 is a top plan view of the supporting-ring, and Fig. 6 is an elevation of the cake-pan removed.

Referring now more particularly to the drawings, the numeral 1 represents a pot or vessel adapted to contain the hot grease in which the cake-pan is submerged for the purpose of cooking the cakes. Fitted over the upper edge of the vessel at diametrically opposite sides thereof are guides 2, each of which is detachably secured in position by a set-screw 3. Sliding in the guides are bars 4, to the upper ends of which are pivoted the ends of a bail-handle 5. The lower ends of the bars are riveted or otherwise secured to a supporting-ring 6, and between said handle and ring each bar is formed with a series of openings 7, arranged at regular intervals apart and adapted to receive pins 8, which rest upon the upper surface of the guides 2 and support the bars in adjusted position, thereby maintaining the ring 6 at any desired elevation within the vessel 1.

The ring 6 is provided adjacent to the bars 4 with open bearings 9 and at right angles thereto at diametrically opposite sides thereof with slots or recesses 10. The ring 6 is adapted to support the cake-pan 11, which comprises in its construction two corresponding foraminous plates or sections 12 and 13, hinged together at 14, so that the section 13 may be turned over upon the section 12, the said two sections being provided with projections 15, which are brought into contact when the sections are closed together to form trunnions to fit within the bearings 9 of the ring 6 to mount the cake-pan in said ring, so that said pan may be turned over whenever desired to expose both surfaces of the cake to the action of the hot grease, and thereby insure equable cooking.

The base-pan section 12 has attached thereto a permanent handle 16, and the upper section 13 is adapted to be held closed by a suitable form of catch 17 and is provided adjacent to the hinge with an eye or socket 18 and at its opposite free edge with a corresponding eye or socket 19. These eyes or sockets 18 and 19 are adapted to receive the hook-shaped end 20 of a removable handle 21 in raising and lowering the pan to apply it to and remove it from the ring 6 and in opening and closing said section 13.

In using the invention the ring 6, bars 4, and handle 5 are applied to the vessel 1 in the manner shown in Figs. 1 and 2, the vessel 1 supplied with hot grease to the desired depth, and the ring 6 raised to the limit of its upward movement by removing the pins and drawing upward on the handle 5. The pins 8 are then reinserted within the openings 7 to hold the ring 6 supported in its adjusted position. After the pan 11 has been supplied with the cake-batter in the ordinary manner the section 13 is closed over upon the section 12 by means of the handle 21, fitted within the socket 19, and then said handle 21 is removed and placed within the socket 18 and the catch 17 engaged with said section 13 to prevent the same from accidentally opening. The cake-pan 11 is then lowered by means of the handles 16 and 21 until the trunnions 15 rest within the bearings 9 of the ring 6, when the handle 21 is removed and the handle 16 dropped down into one of the notches 10, thereby supporting the pan in a horizontal position and preventing it from tilting. When this has been done, the supporting-frame, consisting of the ring 6, the bars 4, and the handle 5, is lowered until the cake-pan is submerged to the desired depth in the hot grease contained within the vessel 1. As the lower side of the cake is exposed to the greatest heat, it is desirable in order to cook the cake thoroughly to expose both sides thereof to the action of the hot grease below, and this is accomplished by grasping the handle 16 and oscillating the pan 11 on its trunnions 15, the said handle 16 being allowed to drop into the opposite notch 10 to hold the pan in adjusted position. By this means even and thorough cooking of the cake is insured. When it is desired to remove the cooked cake, the supporting-frame is elevated by drawing up on the handle 5 and the pins 8 placed in position in the proper openings 7 to support the ring 6 and the cake-pan above the level of the hot grease. The handle 21 is then applied to the socket 18 and the pan lifted by drawing upon both handles 16 and 21. The handle 21 is then removed from the socket after the pan has been rested upon a suitable support and engaged with the socket 19, whereupon after the catch 17 has been released the section 13 may be drawn open to the position shown in Fig. 3 to expose the cake or cakes, so that the same may be readily removed. The handle 21 when not in use may be supported upon one of the set-screws 3, as shown in Fig. 1.

From the foregoing description, taken in connection with the accompanying drawings, the construction, mode of operation, and advantages of the invention will be readily understood, and it will be seen that the invention provides simple and effective means whereby the cake-pan may be readily and conveniently turned and raised and lowered in the vessel 1 to facilitate the insertion and removal of the pan and to submerge the same to any desired depth in the hot grease.

Changes in the form, proportion, and minor details of construction may be made within the scope of the invention without departing from the spirit or sacrificing any of the advantages thereof.

Having thus described our invention, what we claim, and desire to secure by Letters Patent, is—

1. A cake cooking and turning device comprising a supporting-ring having two sets of diametrically opposite sockets arranged at right angles to each other, means for raising and lowering said ring, and a cake-pan provided with trunnions fitting in one set of sockets to turn upon the ring and consisting of hinged sections, one having a handle attached thereto and the other sockets at diametrically opposite sides thereof for the reception of the handle to open and close said latter-named section and to lower and raise the pan to and from its supporting-ring, said handle being adapted to seat in one socket of the other set of sockets when the pan is in a lowered position to prevent said pan from turning, substantially as described.

2. In a cake cooker and turner, the combination with a vessel; of guides adapted to fit over the upper edge of the vessel, a supporting-ring, perforated bars connected to the ring and sliding through said guides, pins adapted to be passed through the perforations in the bars to support them in adjusted position upon said guides, and a cake-pan provided with trunnions to turn upon the ring and consisting of hinged sections, one having a handle attached thereto and the other sockets at diametrically opposite sides thereof for the reception of the handle to open and close said latter-named section and to lower and raise the pan to and from said supporting-ring, substantially as set forth.

In testimony whereof we have hereunto set our hands in presence of two subscribing witnesses.

HARRY W. ARNER.
CHARLES M. GOODWIN.

Witnesses:
GEO. H. SWIFT,
E. BURDETTE ROGERS.